US011809725B2

(12) United States Patent
Wang et al.

(10) Patent No.: US 11,809,725 B2
(45) Date of Patent: Nov. 7, 2023

(54) DOCUMENT STORAGE WITH BLOCKS SPLIT BETWEEN MULTIPLE REPOSITORIES

(71) Applicant: International Business Machines Corporation, Armonk, NY (US)

(72) Inventors: Wei U Wang, Beijing (CN); Jie Zhang, Beijing (CN); Hong Lin G Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 17/500,173

(22) Filed: Oct. 13, 2021

(65) Prior Publication Data

US 2023/0116847 A1 Apr. 13, 2023

(51) Int. Cl.
*G06F 3/00* (2006.01)
*G06F 3/06* (2006.01)

(52) U.S. Cl.
CPC .............. *G06F 3/064* (2013.01); *G06F 3/0604* (2013.01); *G06F 3/061* (2013.01); *G06F 3/0614* (2013.01); *G06F 3/0644* (2013.01); *G06F 3/067* (2013.01)

(58) Field of Classification Search
None
See application file for complete search history.

(56) References Cited

U.S. PATENT DOCUMENTS

| 7,734,826 | B2 | 6/2010 | Brown et al. | |
|---|---|---|---|---|
| 8,260,742 | B2 | 9/2012 | Cognigni et al. | |
| 11,487,628 | B1* | 11/2022 | Matze et al. | G06F 11/2097 |
| 2002/0194207 | A1 | 12/2002 | Bartlett et al. | |
| 2005/0216524 | A1 | 9/2005 | Gomes et al. | |
| 2015/0261801 | A1* | 9/2015 | Barton et al. | G06F 16/951 707/697 |
| 2018/0074744 | A1* | 3/2018 | Kazi et al. | G06F 3/0634 |
| 2019/0179805 | A1 | 6/2019 | Prahlad et al. | |

OTHER PUBLICATIONS

"Uploads and Downloads", Cloud Storage, Google Cloud, Last Updated on May 20, 2021, Downloaded to the internet on May 26, 2021, 5 pgs., <https://cloud.google.com/storage/docs/uploads-downloads>.
Lovelace, et al., "IBM Enterprise Content Management and System Storage Solutions: Working Together", Redbooks, IBM, © Copyright International Business Machines Corporation 2008, Sep. 2008, 244 pgs.

* cited by examiner

*Primary Examiner* — Midys Rojas
(74) *Attorney, Agent, or Firm* — David B. Woycechowsky (57) ABSTRACT

In a computer system that includes a set of cross repositories for data storage, a document is broken into portions, and each portion is stored in at least one repository (and preferably many or all of the cross repositories). In this way, when a portion of the document requires an update, the communication of updated data can be limited to the relevant portion(s) of the document. Also, if a user requires only certain portion(s) of the saved document, then the data transfer from a cross repository to the user can be limited to those certain portion(s) of the document.

9 Claims, 4 Drawing Sheets

DOCUMENT STORAGE WITH BLOCKS SPLIT BETWEEN MULTIPLE REPOSITORIES

BACKGROUND

The present invention relates generally to the field of repositories for storing computer documents.

The Wikipedia entry for "content repository" (as of Aug. 25, 2021) states, in part, as follows: "A content repository or content store is a database of digital content with an associated set of data management, search and access methods allowing application-independent access to the content, rather like a digital library, but with the ability to store and modify content in addition to searching and retrieving. The content repository acts as the storage engine for a larger application such as a content management system or a document management system, which adds a user interface on top of the repository's application programming interface. Advantages provided by repositories[.] Common rules for data access allow many applications to work with the same content without interrupting the data. They give out signals when changes happen, letting other applications using the repository know that something has been modified, which enables collaborative data management. Developers can deal with data using programs that are more compatible with the desktop programming environment. The data model is scriptable when users use a content repository. Content repository features[.] A content repository may provide functionality such as: Add/edit/delete content[,] Hierarchy and sort order management[,] Query / search[,] Versioning[,] Access control[,] Import / export[,] Locking[,] Life-cycle management[,] Retention and holding / records management[.]" (footnote(s) omitted)

Searching for content across multiple repositories (cross-repository searches) will now be discussed. Searching for content across repositories is useful when the items that you need are spread throughout multiple repositories. For example, you might use a cross-repository search to look for customer billing records in one repository and contracts that are stored in another repository.

SUMMARY

According to an aspect of the present invention, there is a method, computer program product and/or system that performs the following operations (not necessarily in the following order): (i) receiving a computer readable document (CRD) that is to be stored in a data storage computer system including a plurality of repository subsystems, with each repository subsystem being structured, programmed and/or connected in data communication to store computer readable data; (ii) splitting the document into a plurality of portions; and (iii) for each given portion of the plurality of portions, storing the given portion in a least one repository subsystem as an independently accessible file to form an original version of the CRD stored in the plurality of repository subsystems.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. the Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
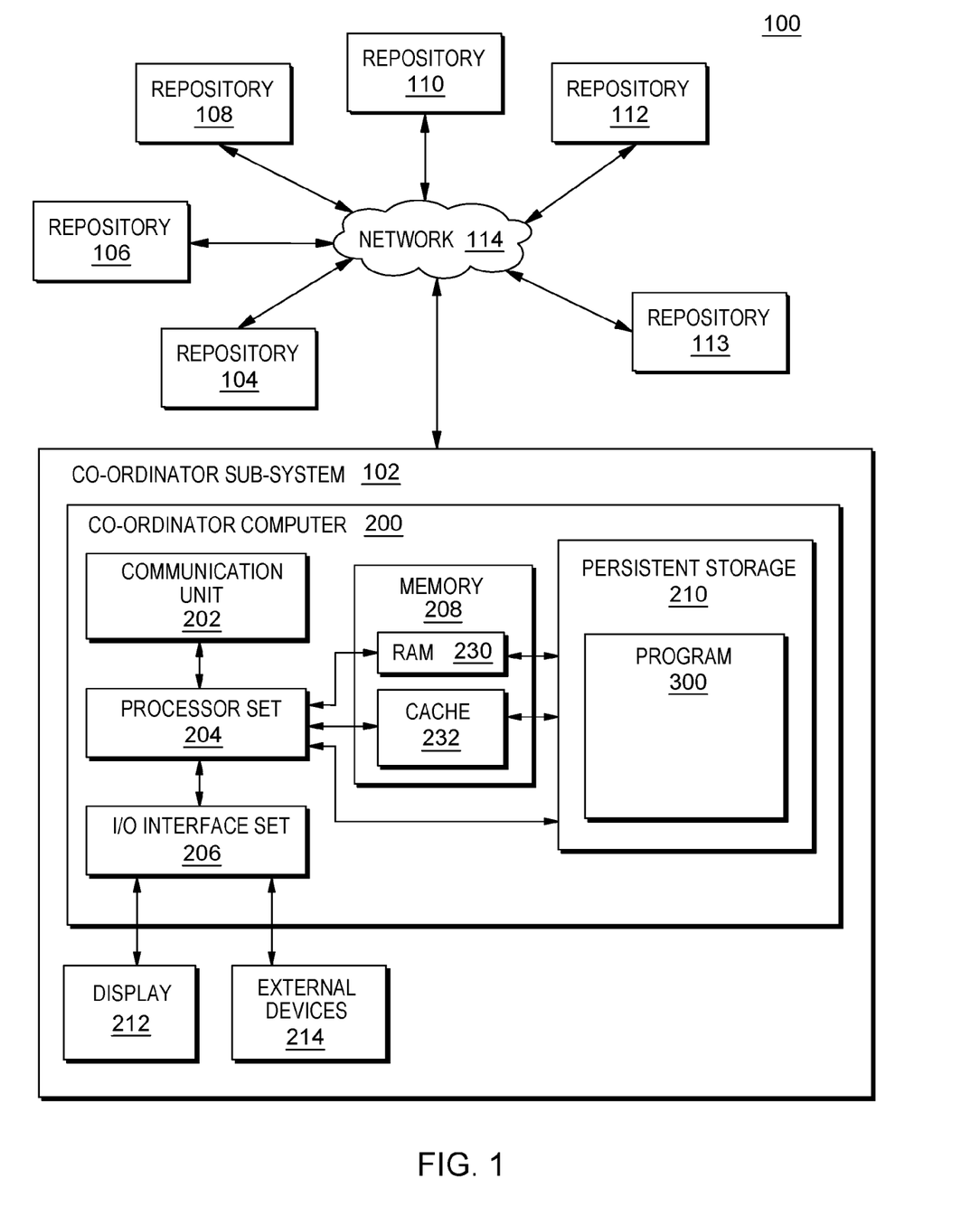
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client repositories 104, 106, 108, 110, 112, 113; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
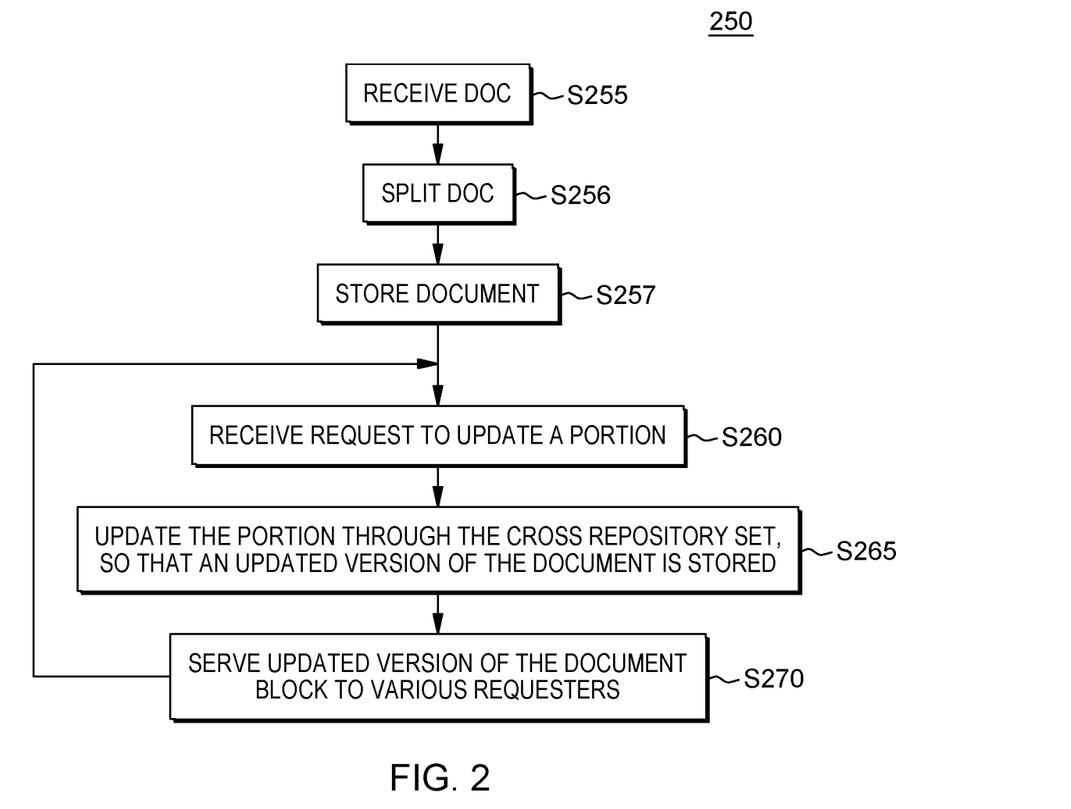
FIG. 2 is a flowchart showing a first embodiment method performed, at least in part, by the first embodiment system.
Figure 3:
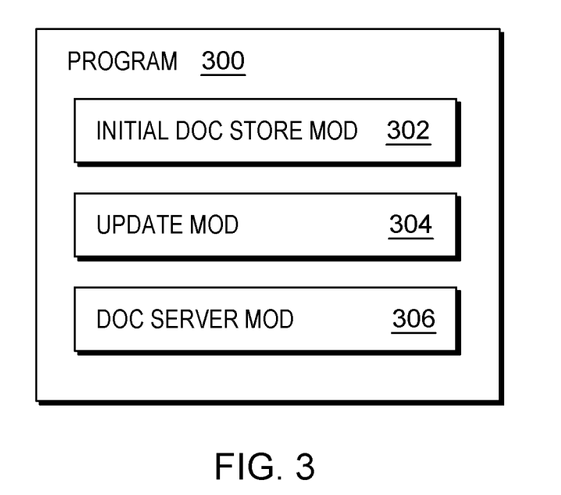
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where initial document store module ("mod") 302 controls a document 402 (made up of four (4) portions 402a, 402b, 402c, 402d) to be stored in the various repositories (also sometimes referred to as repository subsystems) 104, 106, 108, 110, 112, 113.

Figure 4:
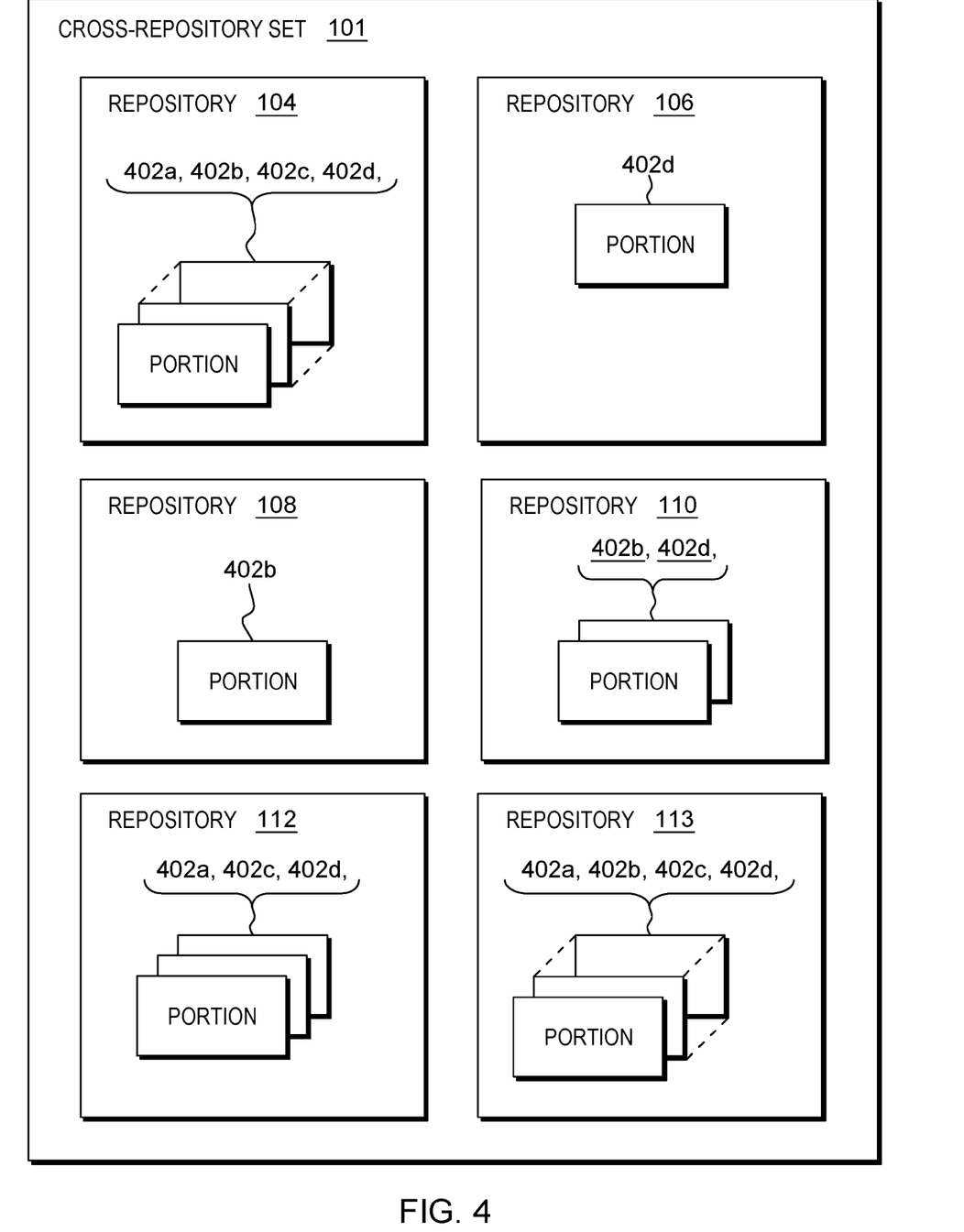
FIG. 4 is a screenshot view generated by the first embodiment system.

Processing proceeds to operation S256, where mod 302 splits the document into a plurality of portions 402a, 402b, 402c and 402d (see FIG. 4). In some embodiments, each of these portions may be in the form of a block with each block being characterized by the same data volume. In operation S256, each portion can be stored as an independently accessible file.

Processing proceeds to operation S257, where mod 302 stores each portion 402a to 402d in at least one repository subsystem as an independently accessible file to form an original version of the CRD (computer readable document) stored in the plurality of repository subsystems. As shown in cross-repository set 101 of FIG. 4, in this example: (i) repositories 104 and 113 store all portions 402a,b,c,d of the original version of the CRD; and (ii) repositories 106, 108, 110, 112 each store at least one portion, but less than all of the portions. In some embodiments, each portion may be stored only once, in a single repository. In some embodiments, all portions (that is, the entire CRD) may be stored in all repositories 104, 106, 108, 110, 112, 113. In some embodiments, that target may be to store every portion of the document in all repository subsystems, but that target may not always be met, for various reasons (for example, available storage capacity of the various repositories), such that each portion ends up being stored in: (i) at least one repository; or (ii) at least two repositories (for increased reliability and accessibility).

Processing proceeds to operation S260, where update mod 304 receives a request to update the document.

Processing proceeds to operation S265, where mod 304: (i) determines a set of portion(s), of multiple portions 402a,

*b,c,d*, that need to be revised due to the update; and (ii) revises the set of set of portion(s) according to the requested update, with the revision of the set of portion(s) including storing each portion 402*a,b,c,d* in at least one repository subsystem as respective independently accessible file(s) to form an updated version of the CRD stored in the plurality of repository subsystems. In this way, only the portions of the document that require updating must actually be updated. To further explain, instead of updating a file that is large because it includes all of the data of the CRD, mod 304 must only augment, or replace, some of the portions, but not all of the portions. The advantage of this can be especially great when only a small revision (for example, one portion) of a very large CRD needs to be revised. Only the one portion must be communicated and stored to repository(ies), instead of the entire large file.

Processing proceeds to operation S270, where document server mod 306 receives a request for the CRD from a user. Because the request is received after the update of operation S265 has already been made, the user will get the updated version of the CRD. Alternatively, in some embodiments, the user may be given the choice between receiving the original version of the CRD or the updated version of the CRD. Also at operation S270, mod 306 causes sending the updated version of the CRD to the user. When a new request to update the CRD is received, then processing loops back to operation S260, as shown in FIG. 2.

III. Further Comments and/or Embodiments

Some embodiments of the present invention recognize the following facts, potential problems and/or potential areas for improvement with respect to the current state of the art: (i) currently, enterprises maintain documents using document management systems; (ii) there could be multiple repositories across the site in the document management system; (iii) when a user uploads or updates documents, the document needs to be in sync with all these repositories; (iv) from the client side, the upload or update needs to be treated as a transaction; (v) the client side gets a successful result until the documents are uploaded to all repositories; (vi) if any document has failed to be uploaded to one of the repositories, the upload should be treated as a failed upload; (vii) it might take a long time for client side to know the result; and/or (viii) it is hard to keep the upload in a transaction.

Some embodiments of the present invention recognize the following facts, potential problems and/or potential areas for improvement with respect to the current state of the art: (i) a content management system is widely used in large enterprises to store unstructured data such as documents; (ii) the documents in the content management system could be stored on multiple repositories; (iii) these repositories could be on different sites and locations; (iv) when a user uploads a new document or updates existing documents, all of the updates or new uploads need to be stored on all of the repositories of the system which is a data intensive operation, especially for large documents; (v) some existing solutions are mainly for business structure data; (vi) it is not suitable for large documents in binary; (vii) some solutions are for file storage purposes based on file systems; and/or (viii) they are not suitable for repository or service based content management systems.

A method for performing document transactions in cross repositories, according to an embodiment of the present invention includes the following operations (not necessarily in the following order): (i) on the client side, the document is split into multiple blocks; (ii) when a user updates the document, only the blocks which are updated are added to the upload queue; (iii) there is an upload policy to distribute blocks to different repositories on remote sites; (iv) during the document upload, each updated block is uploaded to its dedicated repository; (v) this improves the upload efficiency as only the document blocks are uploaded in parallel instead of the whole document; and (vi) on the server side, there is a coordinator that monitors the transition status of each repository.

A method according to an embodiment of the present invention includes the following operations (not necessarily in the following order): (i) once the coordinator consolidates a whole document using the blocks from all repositories, the coordinator returns a response to the client side to indicate the transaction was successful; (ii) the client side can get a quick response, then upload the whole document; (iii) each repository can synchronize other blocks from other repositories so that each repository can get the whole document at the end; (iv) the document operation on multiple repositories is guaranteed in a transaction in an efficient way; (v) the time and cost on network bandwidth is reduced; (vi) each repository is in the same architecture so that it reduces the complexity of maintenance; and (vii) can support not only file based systems but also repository or service-based content management systems.

Some embodiments of the present invention may include one, or more, of the following operations, features, characteristics and/or advantages: (i) the system splits documents into pieces; (ii) the system uploads only the parts that need to be updated; (iii) when uploading to a remote repository, it is not required to upload the whole content to each repository, instead, the system will assign one part to each repository; (iv) there is a coordinator that keeps checking the document parts on these repositories; and/or (v) once the coordinator can consolidate a complete document from the document parts on these repositories, the coordinator returns a successful signal to the client side and then populates the whole document from the parts in the repositories so all repositories have a completed document at the end.

Some embodiments of the present invention may include one, or more, of the following operations, features, characteristics and/or advantages: (i) efficiently implements a document transaction in cross repositories; (ii) reduces the time for document updates in different repositories; and/or (iii) saves network bandwidth for document synchronization.

Figure 5:
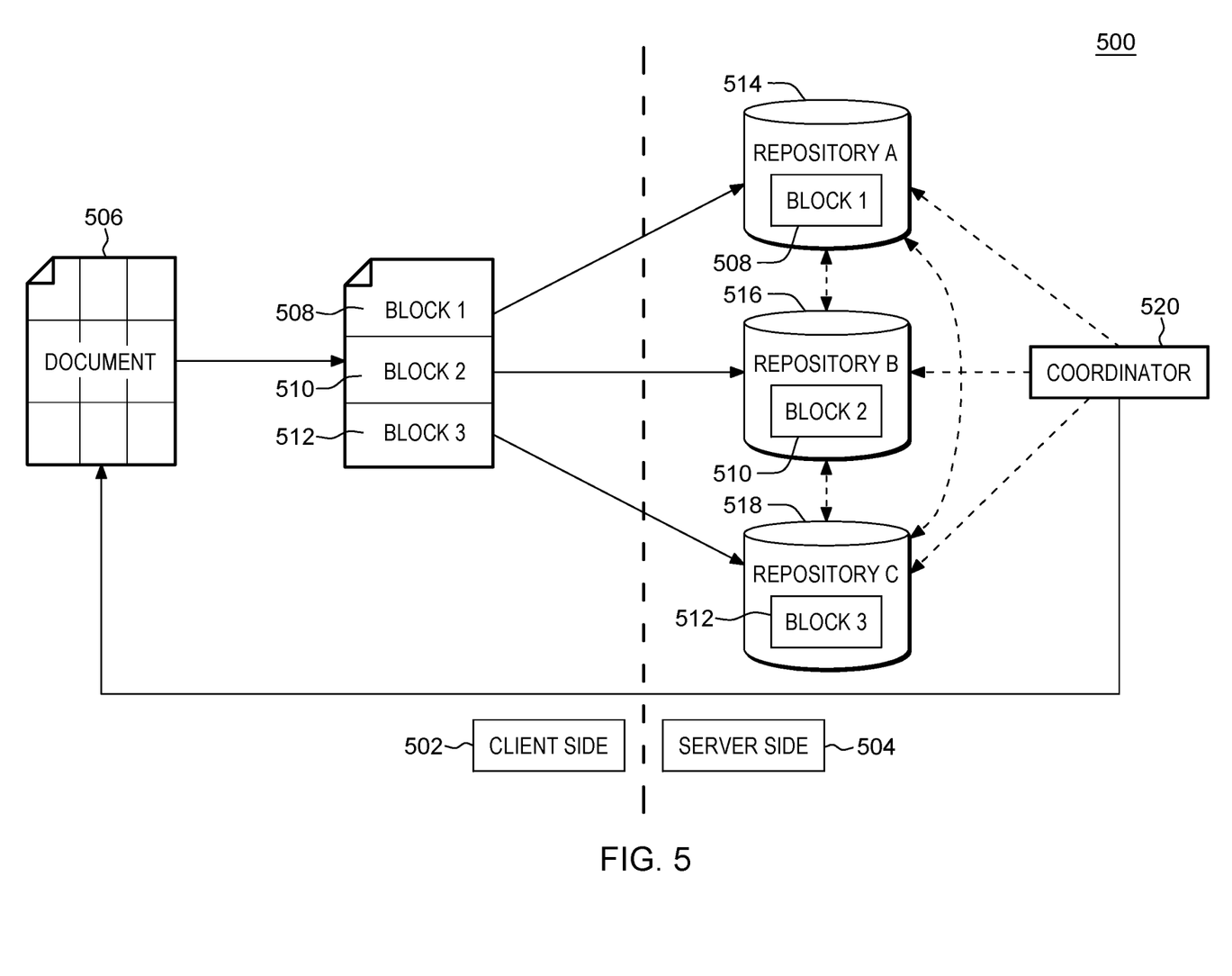
FIG. 5 is a block diagram of a second embodiment of a system according to the present invention.

As shown in FIG. 5, diagram 500 includes: client side block 502; server side block 504; document 506; block 1 block 508; block 2 block 510; block 3 block 512; repository A 514; repository B 516; repository C 518; and coordinator block 520. Some operations performed by system 500 are discussed in the following six (6) paragraphs.

Operation 1: document (506) is stored in multiple blocks (508, 510 and 512).

Operation 2: when document (506) is updated, only upload the changed blocks (508, 510 and 512) in a cross site transaction.

Operation 3: assign the changed blocks (508, 510 and 512) to different repositories (514, 516 and 518) according to network performance. Only upload the assigned blocks to a repository instead of the entire document.

Operation 4: a coordinator check (520) is performed to see if the server side (504) can consolidate a document from the blocks (508, 510 and 512) from all repositories (514, 516 and 518).

Operation 5: if the server side (504) can consolidate a document from the blocks (508, 510 and 512) from all repositories (514, 516 and 518), from operation 4 above, then return a successful transaction response to the client side (502).

Operation 6: the system will sync up the blocks (508, 510 and 512) from the other repositories (514, 516 and 518) to generate a whole document.

Some embodiments of the present invention may include one, or more, of the following operations, features, characteristics and/or advantages: (i) resolves a document upload or update transaction problem in multiple repositories; (ii) each repository contains a whole document copy and keeps all the documents in different repositories synchronized; (iii) divides a document from the client side; (iv) only one document part is uploaded to one repository so that upload speed is fast by only consuming low bandwidth resources; (v) the server side synchronizes parts from another repository and consolidates them into a completed document; and/or (vi) includes document upload and update transactions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above - similar cautions apply to the term "embodiment."

And/or: inclusive or; for example, A, B "and/or" C means that at least one of A or B or C is true and applicable.

Including / include / includes: unless otherwise explicitly noted, means "including but not necessarily limited to."

Module / Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a content repository that includes a plurality of repository subsystems, with content repository data being stored duplicatively in each repository subsystem of the plurality of repository subsystems, the CIM comprising:
receiving a computer readable document (CRD);
splitting the CRD into a plurality of portions;
storing each portion of the plurality of portions in a respectively corresponding repository subsystem so that portions of the CRD, rather than the entirety of the CRD, are transferred over a communication network during this storing operation; and
subsequent to the storing operation and for each given portion of the plurality of portions, copying the given portion from its respectively corresponding repository subsystem to the other repository subsystems of the plurality of repository subsystems so that each repository subsystem can assemble the CRD from the plurality of portions of the CRD stored locally in that repository subsystem.

2. The CIM of claim 1 further comprising:
receiving a request to retrieve the CRD from a first repository subsystem of the content repository; and
responsive to the receipt of the request, assembling the CRD from the plurality of portions stored locally in the first repository subsystem.

3. The CIM of claim 2 further comprising:
sending the CRD, assembled at the assembling operation, to a computer device of a requesting party.

4. A computer program product (CPP) for use with a content repository that includes a plurality of repository subsystems, with content repository data being stored duplicatively in each repository subsystem of the plurality of repository subsystems, the CPP comprising:
a set of storage device(s); and
computer code stored collectively in the set of storage device(s), with the computer code including data and instructions to cause a processor(s) set to perform at least the following operations:
receiving a computer readable document (CRD),
splitting the CRD into a plurality of portions,
storing each portion of the plurality of portions in a respectively corresponding repository subsystem so that portions of the CRD, rather than the entirety of the CRD, are transferred over a communication network during this storing operation, and
subsequent to the storing operation and for each given portion of the plurality of portions, copying the given portion from its respectively corresponding repository subsystem to the other repository subsystems of the plurality of repository subsystems so that each repository subsystem can assemble the CRD from the plurality of portions of the CRD stored locally in that repository subsystem.

5. The CPP claim 4 wherein the computer code further includes instructions for causing the processor(s) set to perform the following operation(s):
receiving a request to retrieve the CRD from a first repository subsystem of the content repository; and
responsive to the receipt of the request, assembling the CRD from the plurality of portions stored locally in the first repository subsystem.

6. The CPP of claim 5 wherein the computer code further includes instructions for causing the processor(s) set to perform the following operation(s):
sending the CRD, assembled at the assembling operation, to a computer device of a requesting party.

7. A computer system (CS) for use with a content repository that includes a plurality of repository subsystems, with content repository data being stored duplicatively in each repository subsystem of the plurality of repository subsystems, the CS comprising:
a processor(s) set;
a set of storage device(s); and
computer code stored collectively in the set of storage device(s), with the computer code including data and instructions to cause the processor(s) set to perform at least the following operations:

receiving a computer readable document (CRD), splitting the CRD into a plurality of portions, storing each portion of the plurality of portions in a respectively corresponding repository subsystem so that portions of the CRD, rather than the entirety of the CRD, are transferred over a communication network during this storing operation, and subsequent to the storing operation and for each given portion of the plurality of portions, copying the given portion from its respectively corresponding repository subsystem to the other repository subsystems of the plurality of repository subsystems so that each repository subsystem can assemble the CRD from the plurality of portions of the CRD stored locally in that repository subsystem.

8. The CS claim 7 wherein the computer code further includes instructions for causing the processor(s) set to perform the following operation(s):

receiving a request to retrieve the CRD from a first repository subsystem of the content repository; and responsive to the receipt of the request, assembling the CRD from the plurality of portions stored locally in the first repository subsystem.

9. The CS of claim 8 wherein the computer code further includes instructions for causing the processor(s) set to perform the following operation(s):

sending the CRD, assembled at the assembling operation, to a computer device of a requesting party.

* * * * *